US009266209B2

(12) United States Patent
Murahashi et al.

(10) Patent No.: US 9,266,209 B2
(45) Date of Patent: Feb. 23, 2016

(54) THERMAL DISPLACEMENT CORRECTING APPARATUS AND METHOD FOR A MACHINE TOOL

(75) Inventors: Toshihiko Murahashi, Niwa-Gun (JP); Hironori Funaguchi, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 527 days.

(21) Appl. No.: 13/306,206

(22) Filed: Nov. 29, 2011

(65) Prior Publication Data

US 2012/0165971 A1 Jun. 28, 2012

(30) Foreign Application Priority Data

Dec. 28, 2010 (JP) ................................ 2010-292026

(51) Int. Cl.
| | |
|---|---|
| G06F 19/00 | (2011.01) |
| G05B 1/00 | (2006.01) |
| B23Q 11/00 | (2006.01) |
| G05B 19/404 | (2006.01) |

(52) U.S. Cl.
CPC .......... *B23Q 11/0007* (2013.01); *G05B 19/404* (2013.01); *G05B 2219/49209* (2013.01)

(58) Field of Classification Search
CPC .................. G05B 19/404; G05B 2219/49207; G05B 2219/37241; G05B 2219/37431
USPC ......... 374/4, 57, 45, 46, 141, 100, 55, 187, 1, 374/8; 702/94–95, 97, 99, 90, 155; 700/174, 175, 176, 275, 177; 33/702
See application file for complete search history.

(56) References Cited

U.S. PATENT DOCUMENTS

| | | | | | |
|---|---|---|---|---|---|
| 2,956,344 | A | * | 10/1960 | Rantsch | 374/55 |
| 4,471,443 | A | * | 9/1984 | Kinoshita et al. | 700/193 |
| 5,266,878 | A | * | 11/1993 | Makino et al. | 318/571 |
| 5,619,414 | A | * | 4/1997 | Ishii | 700/175 |
| 6,019,506 | A | * | 2/2000 | Senda | 374/55 |
| 6,455,807 | B1 | * | 9/2002 | Scott | 219/121.72 |
| 6,471,451 | B2 | * | 10/2002 | Kojima | G05B 19/404 318/471 |
| 6,532,680 | B2 | * | 3/2003 | Braasch et al. | 33/702 |
| 6,806,674 | B2 | * | 10/2004 | Iwashita et al. | 318/567 |
| 7,245,983 | B2 | * | 7/2007 | Suzuki | G05B 19/404 700/174 |
| 7,266,903 | B2 | * | 9/2007 | Sato | 33/702 |

(Continued)

FOREIGN PATENT DOCUMENTS

JP 2006-281335 A1 10/2006

*Primary Examiner* — Gail Kaplan Verbitsky
(74) *Attorney, Agent, or Firm* — Burr & Brown, PLLC

(57) ABSTRACT

A thermal displacement correcting apparatus includes a correction amount estimating device and a parameter automatic selecting device that, in a machine tool having two different sets of specifications that differ due to the presence/absence of a scale and different methods of measuring the lengths of a bed and a table, estimate a thermal displacement correction amount of the machine tool of each set of specifications. The two devices store a collection of parameters for an estimated thermal displacement calculation corresponding to each of the bed, the scale, the table, and a workpiece, as a database, and select the parameters belonging to the set of specifications from the database based on machine information according to each set of specifications, calculate estimated thermal displacements of the bed, the table, and the workpiece, or also the scale, according to the selected parameters, and combine the estimated thermal displacements.

2 Claims, 8 Drawing Sheets

(56) References Cited

U.S. PATENT DOCUMENTS

| | | | |
|---|---|---|---|
| 7,676,338 B2* | 3/2010 | Sato | 702/99 |
| 7,766,541 B2* | 8/2010 | Sato | 374/1 |
| 7,778,725 B2* | 8/2010 | Senda | 700/175 |
| 7,902,785 B2* | 3/2011 | Denk et al. | 318/573 |
| 8,131,385 B2* | 3/2012 | Yuzawa | 700/56 |
| 8,560,260 B2* | 10/2013 | Wakizaka | G01D 5/145 702/104 |
| 2008/0144693 A1* | 6/2008 | Sato | 374/1 |
| 2012/0165971 A1* | 6/2012 | Murahashi | B23Q 11/0007 700/175 |
| 2013/0211598 A1* | 8/2013 | Fujii | G05B 19/404 700/275 |

\* cited by examiner

FIG. 3

| | αi Machine Specification (a) | αi Machine Specification (b) | Ti Machine Specification (a) | Ti Machine Specification (b) | Li Machine Specification (a) | Li Machine Specification (b) |
|---|---|---|---|---|---|---|
| δBED | αA | | TA | | (Xa−X) | (Xe−X) |
| δSCALE | αB | 0 | TB | 0 | (Xb−Xa) | 0 |
| δTABLE | αC | 0 | TC | 0 | (Xw−Xb) | (Xw−Xe) |
| δWorkpiece | αD | | TD | | (X−Xw) | |

FIG. 7

|   | | | Specification No. |   | | | Specification No. |
|---|---|---|---|---|---|---|---|
| 1. | SENSOR | ch1 | 0 | 9. | SENSOR | ch9 | 2 |
| 2. | SENSOR | ch2 | 0 | 10. | SENSOR | ch10 | 2 |
| 3. | SENSOR | ch3 | 0 | 11. | SENSOR | ch11 | 2 |
| 4. | SENSOR | ch4 | 0 | 12. | SENSOR | ch12 | 2 |
| 5. | SENSOR | ch5 | 1 | 13. | SENSOR | ch13 | 2 |
| 6. | SENSOR | ch6 | 1 | 14. | SENSOR | ch14 | 2 |
| 7. | SENSOR | ch7 | 2 | 15. | SENSOR | ch15 | 2 |
| 8. | SENSOR | ch8 | 2 | 16. | SENSOR | ch16 | 2 |

Specification No.
    0        Used with all specifications
    1        Used with specifications having lower tool rest
    2        Not used with any specifications

THERMAL DISPLACEMENT CORRECTING APPARATUS AND METHOD FOR A MACHINE TOOL

BACKGROUND OF THE INVENTION

This application claims the benefit of Japanese Patent Application Number 2010-292026 filed on Dec. 28, 2010, the entirety of which is incorporated by reference.

1. Field of The Invention

The present invention relates to a thermal displacement correcting apparatus and a thermal displacement correcting method for a machine tool such as a NC lathe and a machining center.

2. Description of Related Art

The transfer of heat generated at power portions and slide portions and the like and a change in environment temperature cause thermal deformation in a machine tool. Because this thermal deformation affects the machining accuracy, an apparatus has been proposed that estimates the amount of thermal deformation from the machine body temperature and makes corrections when machining (for example, the apparatus described in Japanese Patent Application Publication No. JP-A-2006-281335). This thermal displacement correcting apparatus estimates and corrects thermal displacement between a workpiece and a blade edge using parameters such as position information, linear coefficient of expansion, and temperature and the like of a scale, a table, and the workpiece.

When this kind of thermal displacement correcting apparatus is applied to machines of the same model but with different specifications, the parameters must be prepared for each, which is tedious. That is, even with machines of the same model, if the machine specifications are different regarding the presence/absence or mounting position of a scale, or the way in which a table is mounted, the position information and linear coefficient of expansion and the like of the scale and table must be set for each set of specifications and stored in the thermal displacement correcting apparatus as a individual parameter files. As the number of sets of specifications increases, it becomes more tedious to set the parameters and operate the various parameter files, and the risk of a malfunction from an incorrectly set parameter increases, such that productivity and manageability of the thermal displacement correcting apparatus become poor.

SUMMARY OF THE INVENTION

Therefore, it is an object of the invention according to first to fourth aspects to provide a thermal displacement correcting apparatus or method for a machine tool, that enables setting and operating to be performed accurately and easily, even if there are a large number of sets of specifications.

In order to achieve this object, a first aspect of the invention relates to a thermal displacement correcting apparatus for a machine tool that has sets of specifications that differ from one another due to at least some estimated elements being different, that includes a correction amount estimating portion that calculates a thermal displacement correction amount of the machine tool of at least one of the sets of specifications. The correction amount estimating portion stores a collection of parameters for an estimated thermal displacement calculation corresponding to each of all of the estimated elements as a parameter group, and is able to read machine information according to the at least one of the sets of specifications, and selects the parameters corresponding to the estimated elements belonging to the at least one of the sets of specifications from the parameter group based on the machine information, calculates an estimated thermal displacement of each estimated element according to the selected parameters, and calculates the thermal displacement correction amount of the machine tool of the at least one of the sets of specifications by combining the estimated thermal displacements.

In order to achieve this object, a second aspect of the invention relates to a thermal displacement correcting apparatus for a machine tool that has sets of specifications that differ from one another due to at least some estimated elements being different, that includes a correction amount estimating portion that calculates a thermal displacement correction amount of the machine tool of at least one of the sets of specifications; and temperature sensors that measure a temperature of the estimated elements. The correction amount estimating portion stores a collection of types of the temperature sensors corresponding to each of all of the estimated elements as a temperature sensor selection database, is able to read machine information according to the at least one of the sets of specifications, selects the type of the temperature sensors corresponding to the estimated elements belonging to the at least one of the sets of specifications from the temperature sensor selection database based on the machine information, calculates an estimated thermal displacement of each of the estimated elements based on the temperatures of the estimated elements ascertained by the temperature sensors of the selected type, and calculates a thermal displacement correction amount of the machine tool of the at least one of the sets of specifications by combining the estimated thermal displacements.

In order to achieve this object, a third aspect of the invention relates to a method for, in a machine tool that has sets of specifications that differ from one another due to at least some estimated elements being different, calculating a thermal displacement correction amount of the machine tool of at least one of the sets of specifications, that includes storing a collection of parameters for an estimated thermal displacement calculation corresponding to each of all of the estimated elements as a parameter group; reading machine information according to the at least one of the sets of specifications, and selecting the parameters corresponding to the estimated elements belonging to the at least one of the sets of specifications from the parameter group based on the machine information; and calculating an estimated thermal displacement of each estimated element according to the selected parameters, and calculating the thermal displacement correction amount of the machine tool of the at least one of the sets of specifications by combining the estimated thermal displacements.

In order to achieve this object, a fourth aspect of the invention relates to a method for, in a machine tool that has sets of specifications that differ from one another due to at least some estimated elements being different, calculating a thermal displacement correction amount of the machine tool of at least one of the sets of specifications, that includes storing a collection of types of temperature sensors that measure a temperature of the estimated elements and that correspond to each of all of the estimated elements as a temperature sensor selection database; reading machine information according to the at least one of the sets of specifications and selecting the type of temperature sensors corresponding to the estimated elements belonging to the at least one of the sets of specifications from the temperature sensor selection database based on the machine information; and calculating an estimated thermal displacement of each of the estimated elements based on the temperatures of the estimated elements ascertained by the temperature sensors of the selected type, and calculating a thermal displacement correction amount of the machine tool of the at least one of the sets of specifications by combining the estimated thermal displacements.

According to the present invention, temperature sensors and parameters corresponding to estimated elements relating to the set of specifications of a machine tool for which a correction is to be made, are selected from a database based on machine information. As a result, even if there are a plurality of sets of specifications, it is sufficient to simply prepare a common database, so productivity (ease of formulation) and manageability of the thermal displacement correcting apparatus and method become extremely good.

BRIEF DESCRIPTION OF THE DRAWINGS

FIG. 3 is a view of a parameter group (parameter database and parameter file).

FIG. 7 is a view showing a frame format of a temperature sensor selection database of the machine tool and thermal displacement correcting apparatus in FIGS. 5 and 6.

DETAILED DESCRIPTION OF THE INVENTION

Hereinafter, example embodiments of the present invention will be described with reference to the drawings as appropriate. It should be noted that the example embodiments are not limited to the examples given below.

[First example embodiment]

Figure 1:
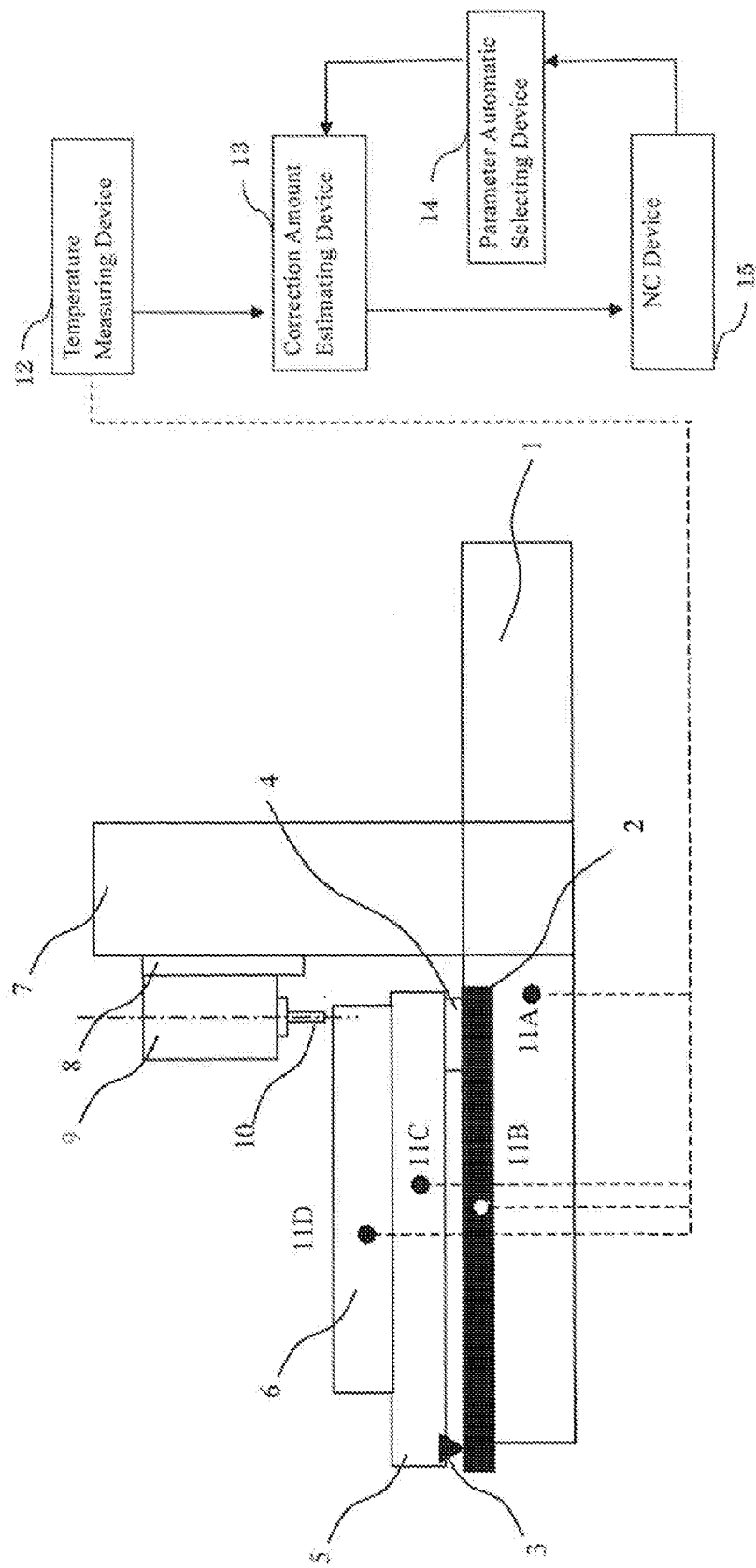
FIG. 1 is a view of a machine toot and thermal displacement correcting apparatus according to a first example embodiment of the present invention.

FIG. 1 is a side view of a machine tool (a portal machining center) to which a thermal displacement correcting apparatus according to a first example embodiment of the present invention has been applied. A bed 1 is arranged along an X-axis (i.e., an axis in the left-right direction in FIG. 1; the right is positive). A table 5 on which a workpiece 6 is able to be mounted is supported so as to be able to move in the direction of the X-axis on the bed 1 via a nut 4.

A column 7 stands on both side surfaces of the bed 1, and a cross rail (not shown) is fixed between the columns 7. A saddle 8 is supported so as to be able to move in the direction of a Y-axis (i.e., an axis in the direction perpendicular to the surface of the paper in FIG. 1; the near side is positive) on the cross rail. Furthermore, a main spindle 9 is supported, so as to be able to move in the direction of a Z-axis (i.e., an axis in the vertical direction of FIG. 1; up is positive), on the saddle 8, and a tool 10 for machining the workpiece 6 is rotatably fixed to a tip end of this main spindle 9.

Figure 2A:
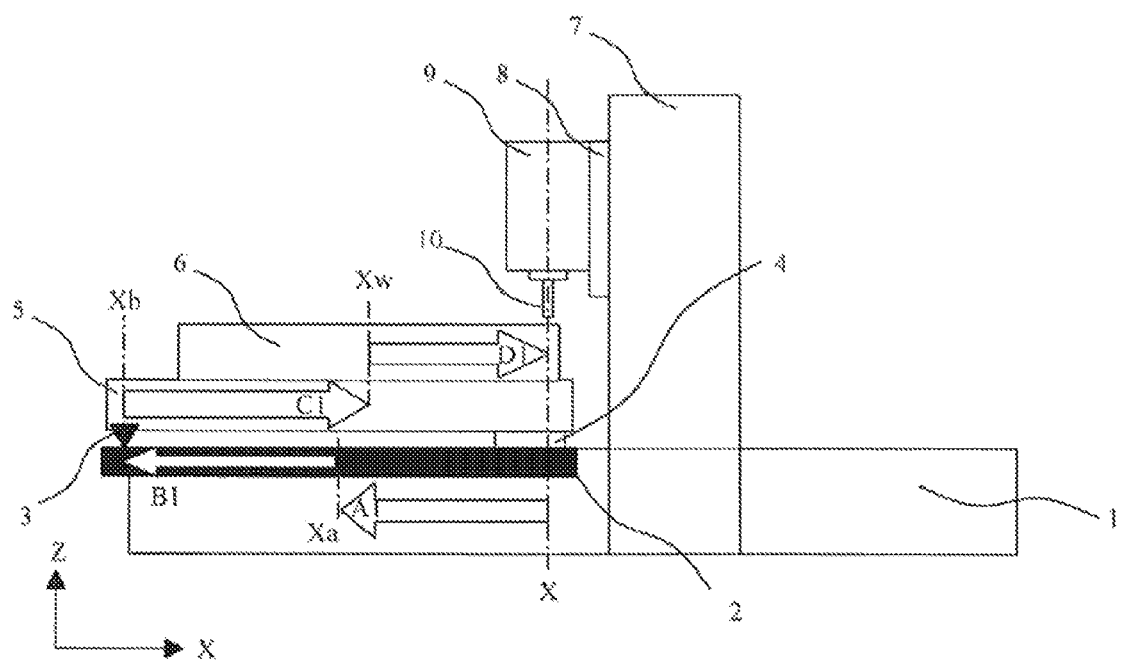
FIG. 2A is a partial view of FIG. 1.
Figure 2B:
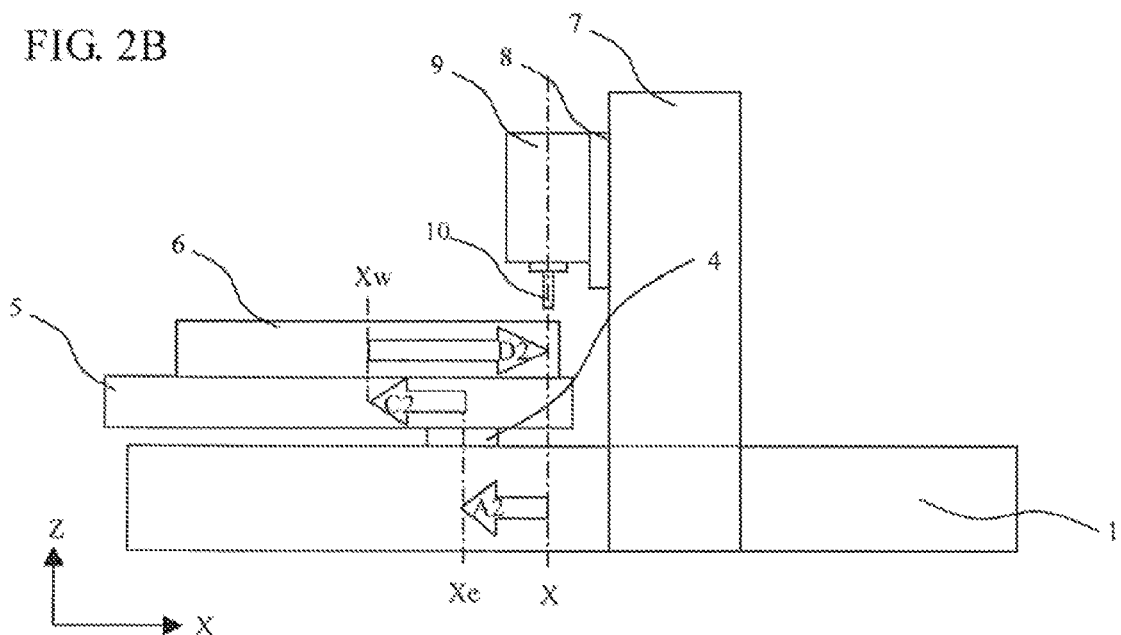
FIG. 2B is a view of a machine tool with different specifications.

FIGS. 2A and 2B are views of portal machining centers of the same model but with different specifications. The portal machining center in FIG. 2A is the same as the portal machining center shown in FIG. 1. With these portal machining centers, the structure related to detecting a movement amount of the table 5 in the direction of the X-axis is different.

According to the specifications in FIG. 2A (referred to as "specifications set A"), the table 5 moves by a ball screw (not shown) combined with the nut 4. The ball screw is rotatably fixed to the bed 1 side, and the nut 4 is fixed to the table 5. According to these specifications, there is a scale 2 and a slider 3 that form a position detector. The scale 2 is fixed to the bed 1, and the slider 3 is fixed to the table 5. A position X of the table 5 is determined by the position detector by, for example, the slider 3 reading position information indicated by the scale 2 and outputting the position information to an NC device that will be described later.

Meanwhile, according to the specifications in FIG. 2B (referred to as "specifications set B"), the table 5 moves by a ball screw (not shown) combined with the nut 4. The ball screw is rotatably fixed to the bed 1 side, and the nut 4 is fixed to the table 5. The position X of the table 5 is determined by rotation control (a rotational position detector) of the ball screw by, for example, converting a rotational position (number of rotations), that is detected by the rotational position detector (not shown) arranged on an end portion of the ball screw, to a X position, in the NC device 15 that will be described later.

As shown in FIG. 1, in specifications set A, temperature sensors 11A to 11D that detect the temperature of the bed 1, the scale 2, the table 5, and the workpiece 6 are provided. In addition, a temperature measuring device 12 that ascertains the temperatures by receiving signals indicative of the detected temperatures from the temperature sensors 11A to 11D, a correction amount estimating device 13 that receives information from the temperature measuring device 12 and a parameter automatic selecting device 14 and calculates a correction amount related to thermal displacement, and the NC device 15 that numerically controls the table 5, the saddle 8, and the main spindle 9 and the like are provided. The parameter automatic selecting device 14 reads machine information of the NC device 15 via communication, and automatically selects estimated calculation parameters of thermal displacement based on the read machine information. The correction amount estimating device 13 and the parameter automatic selecting device 14 form the thermal displacement correcting apparatus according to the present invention, but a combination of these and the temperature sensors 11A to 11D and the temperature measuring device 12 may also be regarded as the thermal displacement correcting apparatus. Also, the correction amount estimating device 13 and the parameter automatic selecting device 14 form a correction amount estimating portion according to the present invention.

In specifications set B as well, the thermal displacement correcting apparatus is configured just as in specifications set A, but no scale 2 is provided, so the temperature sensor 11B related to the scale 2 is not provided, which differs from specifications set A.

Here, the estimated elements of the machine tool of each set of specifications will be described in more detail. With specifications set A, the bed 1, the scale 2, the table 5, and the workpiece 6 can be given as estimated elements related to the thermal displacement estimation. an the other hand, with specifications set B, the bed 1, the table 5, and the workpiece 6 can be given as estimated elements related to the thermal displacement estimation. An estimated element means a mechanical structural element that is considered when a thermal displacement of the machine tool is estimated. Further, in specifications sets A and B, regarding the thermal displacement correction, the estimated elements differ in terms of the presence and absence of the scale 2, while the remaining estimated elements are at least the same, but the content of the length parameters of the estimated elements differ. That is, in specifications set A, the positions of the scale 2 and the slider 3 are part of the length parameter, but in specifications set B, the position of the nut 4 is part of the length parameter.

FIG. 3 is a view (table) showing a frame format of a database as a parameter group for selecting an estimated calculation parameter stored in the correction amount estimating device 13. This database is common among machines of the same model, and is stored in both specifications set A and specifications set B. Here, $\delta_i$ represents the thermal deformation of each estimated element i (the bed 1 if i is A, 1, or bed; the scale 2 if i is B, 2, or scale; the table 5 if i is C, 3, or table; and the workpiece 6 if i is D, 4, or workpiece), $\alpha_i$ represents a linear coefficient of expansion of the estimated element i, $T_i$ represents a detected temperature of the estimated element i, and $L_i$ represents a length of the estimated element i. Also, X represents the position of a blade edge of the tool 10 on the X-axis, Xa represents the position of the scale 2 on the X-axis, Xb represents the position of the slider 3 on the X-axis, Xw represents the position of the workpiece 6 on the X-axis, and Xe represents the position of the nut 4 on the X-axis (see FIG. 2).

Figure 4:
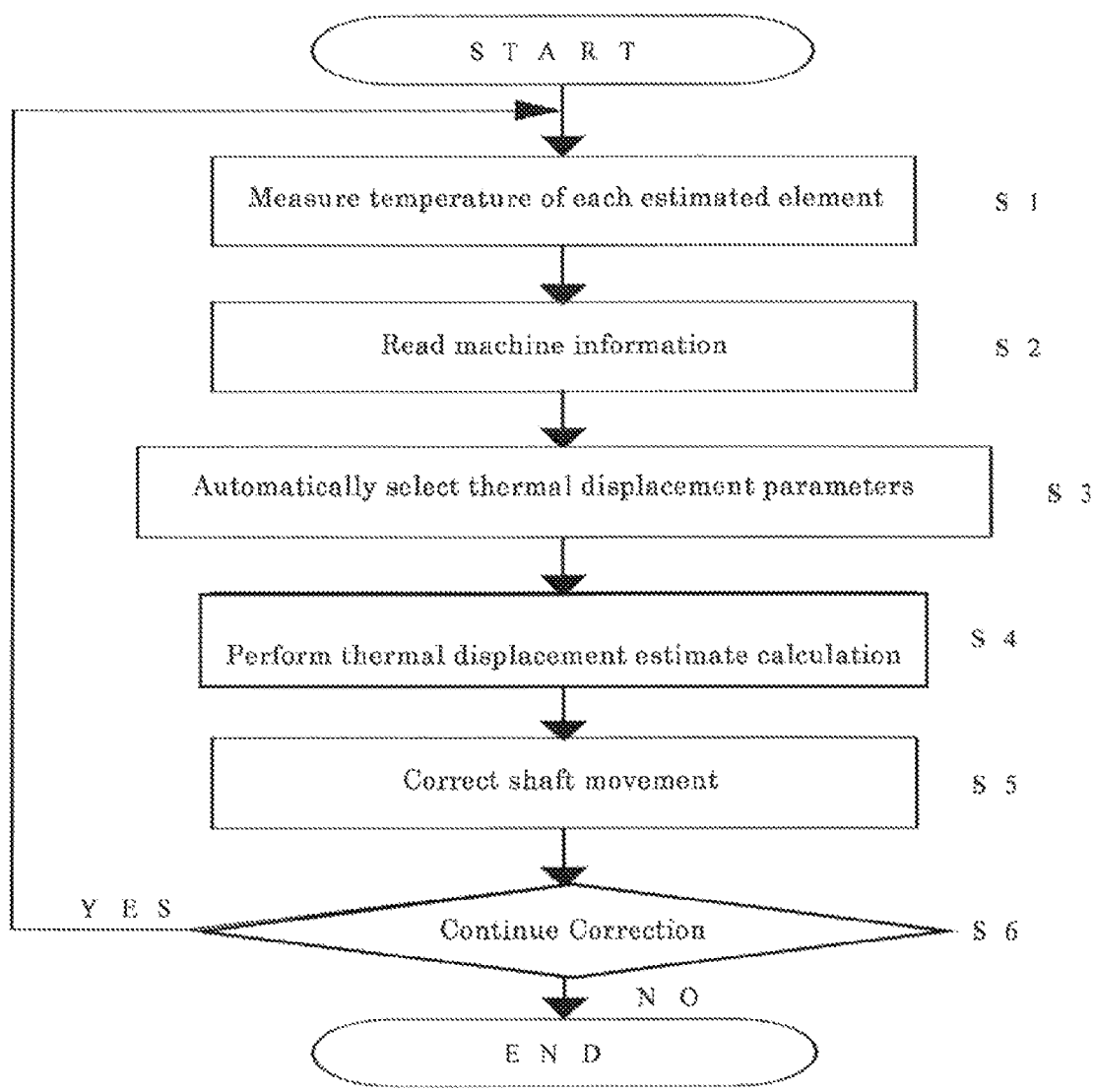
FIG. 4 is a flowchart illustrating operation of the machine tool and thermal displacement correcting apparatus shown in FIG. 2.

This kind of machine tool and thermal displacement correcting apparatus according to the first example embodiment mainly operate, estimate the thermal displacement, and execute a thermal displacement correcting method as illustrated in FIG. 4.

That is, first, in specifications set A, the temperature measuring device 12 receives signals from the temperature sensors 11A to 11D related to the estimated elements i, and estimates the temperatures of the estimated elements i (step S1).

Next, the parameter automatic selecting device 14 reads the machine information from the NC device 15 (step S2). The machine information here is identification information indicative of specifications set A, and the parameter automatic selecting device 14 selects the thermal displacement parameters related to specifications set A, referencing the database in FIG. 3, based on this machine information (step S3). More specifically, the parameter automatic selecting device 14 selects $\alpha_A$ to $\alpha_D$, $T_A$ to $T_D$, (Xa−X), (Xb−Xa), (Xw−Xb), and (X−Xw) as the thermal displacement parameters, referencing the columns of specifications set A.

Continuing on, the correction amount estimating device 13 receives the thermal displacement parameters selected in step S3, and performs an estimate calculation of the thermal displacement using these thermal displacement parameters (step S4). The estimated thermal displacement $\delta_i$ of each estimated element i is expressed by [Expression 1] below.

$$\delta_i = \alpha_i \cdot T_i \cdot L_i \quad \text{[Expression 1]}$$

Therefore, the relative estimated thermal displacement $\Delta$ between the workpiece 6 and the blade edge of the tool 10 is expressed by [Expression 2] below. Here, n is the number of estimated elements (that affects the estimated thermal displacement $\Delta$).

$$\Delta = \int_1^n \delta_1 = \int_1^n \alpha_1 \cdot T_1 \cdot L_1 \quad \text{[Expression 2]}$$

Also, from the thermal displacement parameters selected in step S3, it is evident that the estimated thermal displacement $\Delta$ is the sum of A1 ($\delta$ bed), B1 ($\delta$ scale), C1 ($\delta$ table), and D1 ($\delta$ workpiece) in FIG. 2A. A1 to D1 are as shown in [Expression 3] below, so the estimated thermal displacement $\Delta$ is as shown in [Expression 4] below.

$$\delta\,bed = \alpha_A \cdot T_A \cdot (X_a - X)$$

$$\delta\,scale = \alpha_B \cdot T_B \cdot (X_b - X_a)$$

$$\delta\,table = \alpha_C \cdot T_C \cdot (X_w - X_b)$$

$$\delta\,Work\text{-piece} = \alpha_D \cdot T_D \cdot (X - X_w) \quad \text{[Expression 3]}$$

$$\Delta = \alpha_A \cdot T_A \cdot (X_a - X) - \alpha_B \cdot T_B \cdot (X_b - X_a) - \alpha_C \cdot T_C \cdot (X_w - X_b) - \alpha_D \cdot T_D \cdot (X - X_w) \quad \text{[Expression 4]}$$

When the estimated thermal displacement $\Delta$ is calculated in this way, the correction amount estimating device 13 outputs the estimated thermal displacement $\Delta$ to the NC device 15, and the NC device 15 performs moving control taking the received estimated thermal displacement $\Delta$ into account (step S5). Also, if the correction is continued, the process returns to step S1 and the operation continues. If the correction is not continued, the process ends (step S6).

On the other hand, with specifications set B, the other steps described below operate the same as with specifications set A. That is, when the machine information of specifications set B is read in step S2, the thermal displacement parameters related to specifications set B are selected in step S3 (step S3). More specifically, $\alpha_A$, $\alpha_C$, $\alpha_D$, $T_A$, $T_C$, $T_D$, (Xe−X), (Xw−Xe), and (X−Xw) are selected as the thermal displacement parameters, referencing the columns of specifications set B. "0" means that there are no parameters.

Then, the estimated thermal displacement $\Delta$ is identified as the sum of A2 ($\delta$ bed), C2 ($\delta$ table), and D2 ($\delta$ workpiece) in FIG. 2B. A2, C2, and D2 are as shown in [Expression 5] below, and the estimated thermal displacement $\Delta$ is as shown in [Expression 6] below.

$$\delta\,bed = \alpha_A \cdot T_A \cdot (X_e - X)$$

$$\delta\,table = \alpha_C \cdot T_C \cdot (X_w - X_e)$$

$$\delta\,Work\text{-piece} = \alpha_D \cdot T_D \cdot (X - X_w) \quad \text{[Expression 5]}$$

$$\Delta = \alpha_A \cdot T_A \cdot (X_e - X) - \alpha_C \cdot T_C \cdot (X_w - X_e) - \alpha_D \cdot T_D \cdot (X - X_w) \quad \text{[Expression 6]}$$

The thermal displacement correcting apparatus according to the first example embodiment described above includes the correction amount estimating device 13 and parameter automatic selecting device 14 that, in a machine tool that has two different sets of specifications that differ due to the presence/absence of the scale 2 and different methods of measuring the lengths of the bed 1 and the table 5, estimate the thermal displacement correction amount of the machine tool of each set of specifications. The correction amount estimating device 13 and the parameter automatic selecting device 14 store a collection of parameters for the estimated thermal displacement calculation corresponding to each of the bed 1, the scale 2, the table 5, and the workpiece 6, as a database. In addition, the correction amount estimating device 13 and parameter automatic selecting device 14 are able to read the machine information according to each set of specifications, select the parameters (those relating to the bed 1, the scale 2, the table 5, and the workpiece 6 if specifications set A, with the length measured based on the scale 2 and the slider 3; and those relating to the bed 1, the table 5, and the workpiece 6 if specifications set B, with the length measured based on the nut 4) corresponding to the bed 1, the scale 2, the table 5, and the workpiece 6 belonging to the set of specifications from the database based on the machine information, calculates the estimated thermal displacements of the bed 1, the table 5, and the workpiece 6 or also the scale 2 according to the selected parameters, and calculates the thermal displacement correction amount of the machine tool of each set of specifications by combining the estimated thermal displacements.

Accordingly, one type of the parameter database and the thermal displacement correcting apparatus may be prepared for each machine tool of the same model, regardless of the specifications. It is no longer necessary to prepare a parameter database and change the parameter settings for each set of specifications, nor is it necessary to operate numerous types of parameter databases and cross-check with the specifications in the parameter databases, so the risk of a malfunction occurring due to a discrepancy in the parameters and specifications can be reduced. As a result, productivity and manageability of the thermal displacement correcting apparatus related to a machine tool having a plurality of sets of specifications become extremely good.

Also, the thermal displacement correcting method according to the first example embodiment is a method for; in a machine tool that has two different sets of specifications that differ due to the presence/absence of the scale 2 and different methods of measuring the lengths of the bed 1 and the table 5, estimating the thermal displacement correction amount of the machine tool of each set of specifications, that includes a step in which the correction amount estimating device 13 and the parameter automatic selecting device 14 store a collection of parameters for the estimated thermal displacement calculation corresponding to each of the bed 1, the scale 2, the table 5, and the workpiece 6, as a database in advance, a step in which the correction amount estimating device 13 and the parameter automatic selecting device 14 read the machine information according to each set of specifications, select the parameters (those relating to the bed 1, the scale 2, the table 5, and the workpiece 6 if specifications set A, with the length measured based on the scale 2 and the slider 3; and those relating to the bed 1, the table 5, and the workpiece 6 if specifications set B, with the length measured based on the nut 4) corresponding to the bed 1, the scale 2, the table 5, and the workpiece 6 belonging to the set of specifications from the database based on the machine information, and a step in which the correction amount estimating device 13 and the parameter automatic selecting device 14 calculate the estimated thermal displacements of the bed 1, the table 5, and the workpiece 6 or also the scale 2 according to the selected parameters, and calculate the thermal displacement correction amount of the machine tool of each set of specifications by combining the estimated thermal displacements.

Accordingly, it is sufficient to prepare only one type for a parameter group regardless of the specifications. It is no longer necessary to prepare a parameter database and change the parameter settings for each set of specifications, nor is it necessary to operate numerous types of parameter databases and cross-check with the specifications in the parameter databases, so the risk of a malfunction occurring due to a discrepancy in the parameters and specifications can be reduced. As a result, ease of formulation and manageability of the thermal displacement correcting method related to the machine tool having a plurality of sets of specifications becomes extremely good.

[Second example embodiment]

Figure 5:
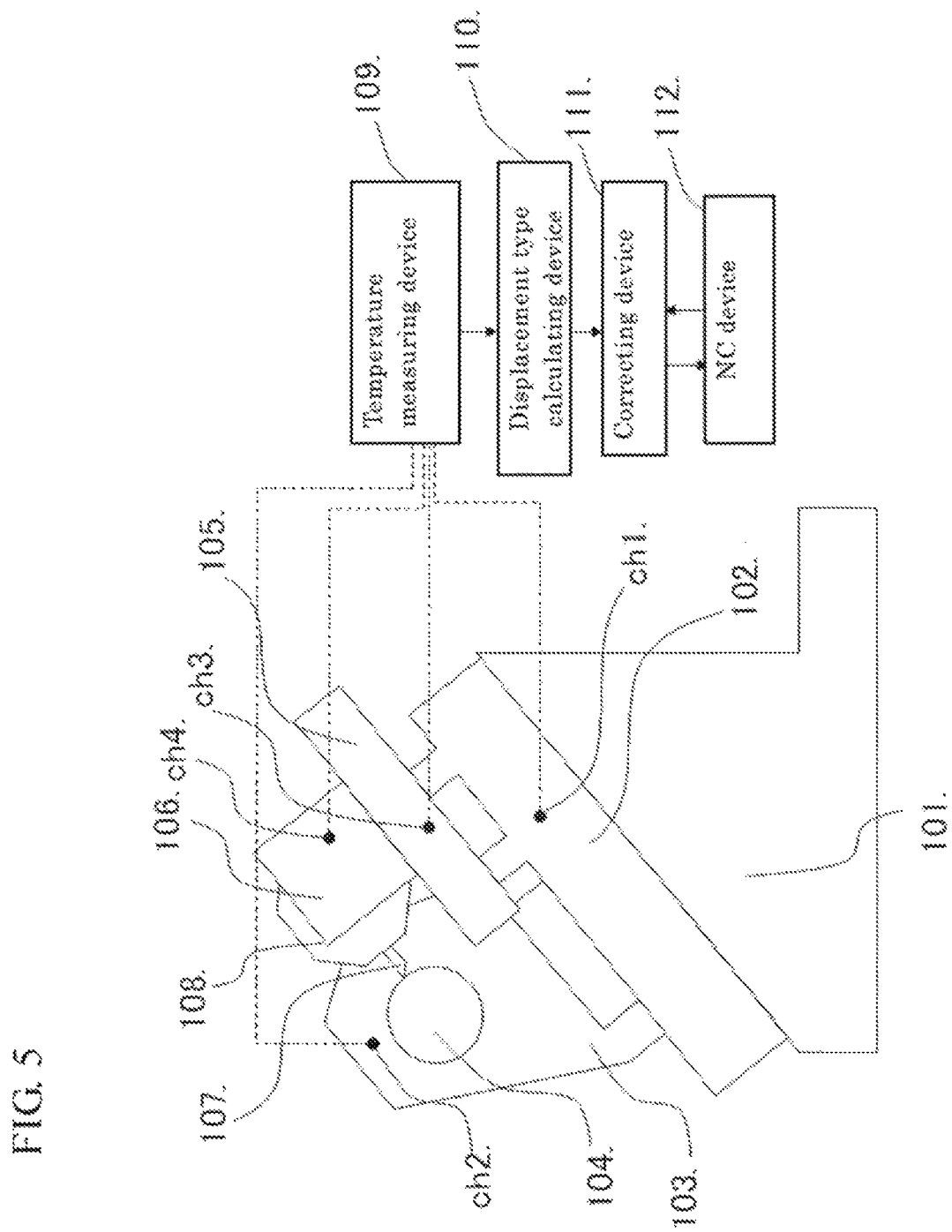
FIG. 5 is a view of a machine tool and thermal displacement correcting apparatus according to a second example embodiment of the present invention.

FIG. 5 is a side view of a machine tool (standard specifications) to which a thermal displacement correcting apparatus according to a second example embodiment of the present invention has been applied. A headstock 103 is arranged on a bed 102 on a leg 101. The headstock 103 rotatably supports a main spindle 104 that has a chuck (not shown) that holds a workpiece. Also, a saddle 105 is arranged so as to be able to move in the axial direction of the main spindle 104 (i.e., in the direction perpendicular to the surface of the paper on which FIG. 5 is drawn) on the bed 102, a tool rest 106 is supported so as to be able to move in the radial direction of the main spindle on the saddle 105, and a turret 108 that holds a tool 107 is provided on the tool rest 106.

Further, temperature sensors ch1 to ch4 are arranged on the bed 102, the headstock 103, the saddle 105, and the tool rest 106, respectively. A temperature measuring device 109 that converts analog signals output from these temperature sensors into digital signals and quantifies them, a displacement type calculating device 110 as a correction amount estimating portion that calculates a relational expression of the thermal displacement from the quantified temperature measurement values, a correcting device 111 that obtains a correction amount using that relational expression, and a NC device 112 that controls the saddle 105 and the tool rest 106 based on the correction amount, are provided. Machine information indicative of the specifications of the machine tool for which the displacement type calculating device 110 is installed is stored in the displacement type calculating device 110.

Figure 6:
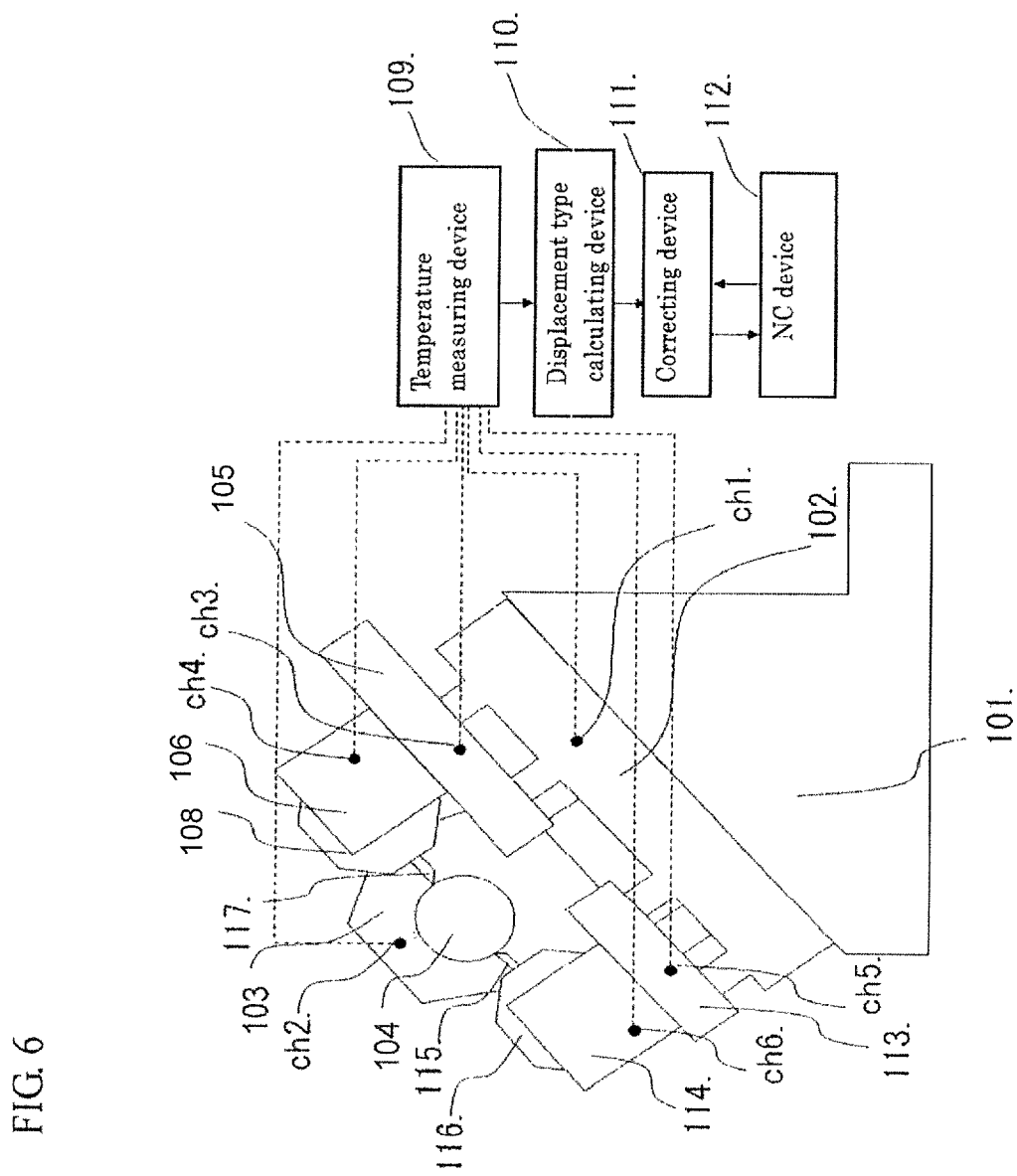
FIG. 6 is a view of a machine tool and thermal displacement correcting apparatus that are the same models as the machine tool and thermal displacement correcting apparatus in FIG. 5 but with different specifications.

FIG. 6 is a view of a machine tool that is the same model as the machine tool and in FIG. 5 but with different specifications in that it also has a lower tool rest 114 and the like as an estimated element (a constituent element). That is, this machine tool is the same as the machine tool in FIG. 5, except that a lower saddle 113 is also provided on the bed 102, a lower tool rest 114 is supported so as to be able to move in the radial direction of the main spindle 104 on the lower saddle 113, and a lower turret 116 that holds a lower tool 115 is provided on the lower tool rest 114. Also, temperature sensors ch5 and ch6 are arranged on the lower saddle 113 and the lower tool rest 114.

FIG. 7 is a table showing a database for a temperature sensor selection (a temperature sensor selection database and temperature sensor selection file). The database is stored in the displacement type calculating device 110. In this database, information indicating whether a sensor is used with both sets of specifications ("0" in this case), whether a sensor is used only with the set of specifications having the lower tool rest 114 and the like in FIG. 6 ("1" in this case), or whether a sensor is not used with either of the sets of specifications ("2" in this case), is linked to each temperature sensor ch1 to ch6.

Figure 8:
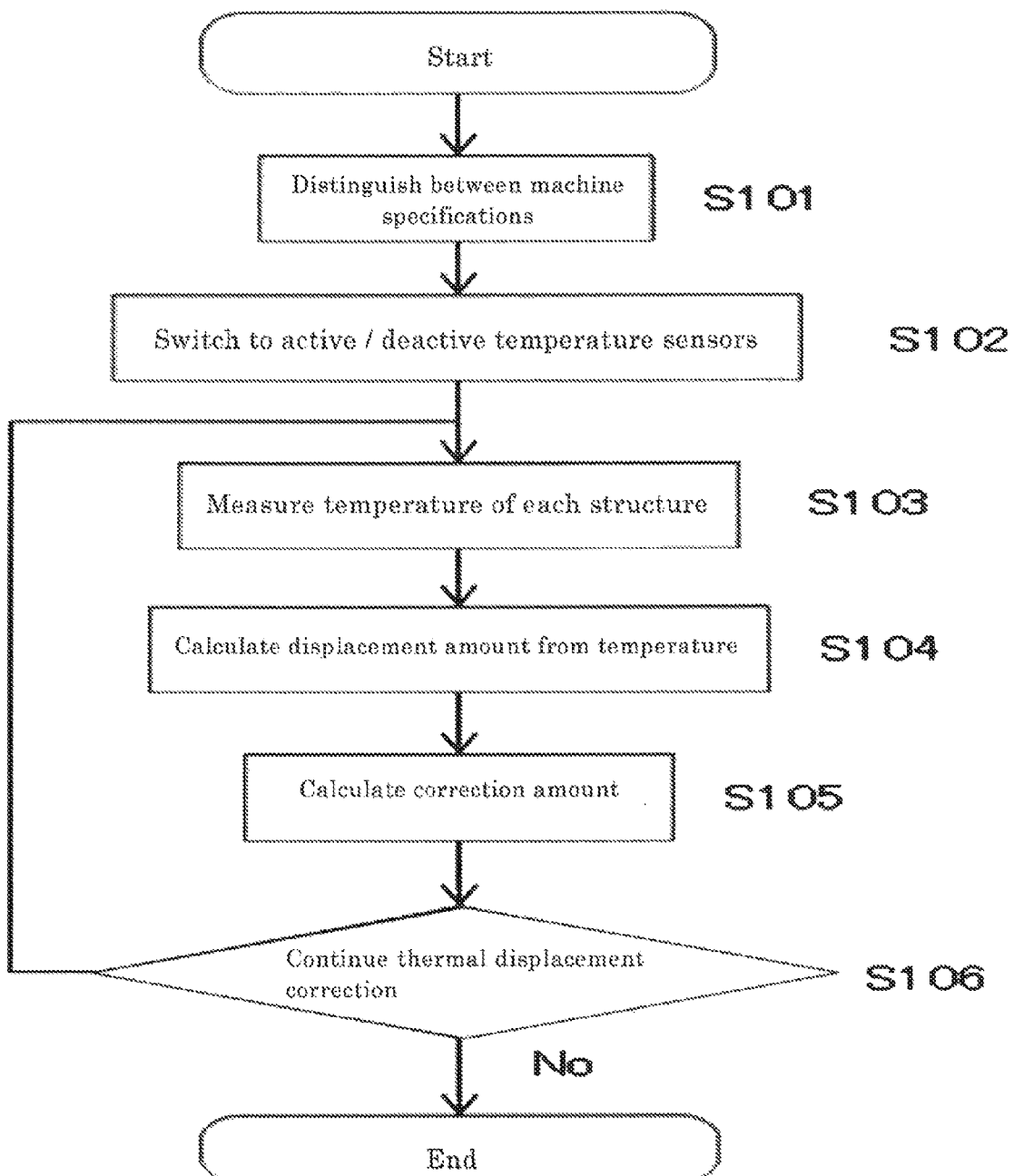
FIG. 8 is a flowchart illustrating operation of the machine tool and thermal displacement correcting apparatus in FIGS. 5 and 6.

This kind of machine tool and thermal displacement correcting apparatus according to the second example embodiment mainly operate, estimate the thermal displacement, and execute a thermal displacement correcting method as illustrated in FIG. 8.

In other words, with the standard specifications, the machine information corresponding to the standard specifications is read, and the specifications are understood to be standard specifications (step S101). Based on this, the temperature sensors ch1 to ch4 given a value of "0" in the temperature sensor selection database are selected, and the setting is switched to activate the temperature sensors ch1 to ch4 (and deactivate the other temperature sensors ch5 and ch6) (step S102). Then, the temperatures of the structures (in this case, the bed 102, the headstock 103, the saddle 105, and the tool rest 106) are measured by the active temperature sensors ch1 to ch4 (step S103), a displacement amount (estimated thermal displacement) is calculated from the measured temperatures just as in the first example embodiment (step S104), a correction amount is calculated (step S105), and a correction is continued as appropriate (step S106).

On the other hand, with the different specifications, the machine information corresponding to different specifications is read, and it is understood that the specifications are different specifications (step S101). Based on this, the temperature sensors ch1 to ch6 given a values of "0" and "1" in the temperature sensor selection database are selected, and the setting is switched to activate the temperature sensors ch1 to ch6 (step S102). Then, the temperatures of the structures (i.e., the estimated elements, in this case, the bed 102, the headstock 103, the saddle 105, the tool rest 106, the lower saddle 113, and the lower tool rest 114) are measured by the active temperature sensors ch1 to ch6 (step S103), a displacement amount and a correction amount are calculated just as with the standard specifications (steps S104 and 105), and a correction is continued as appropriate (step S106).

The thermal displacement correcting apparatus according to the second example embodiment described above includes i) the displacement type calculating device 110 that, in a machine tool that has different sets of specifications (i.e., standard specifications and different specifications) that differ from one another due to the presence/absence of the lower saddle 113 and the lower tool rest 114, calculates the thermal displacement correction amount of the machine tool of at least one of the sets of specifications, and ii) the temperature sensors ch1 to ch6 that measure the temperatures of the bed 102, the headstock 103, the saddle 105, the tool rest 106, the lower saddle 113, and the lower tool rest 114. The displacement type calculating device 110 stores a collection of types of the temperature sensors ch1 to ch6 corresponding to all of the bed 102, the headstock 103, the saddle 105, the tool rest 106, the lower saddle 113, and the lower tool rest 114, respectively, as a temperature sensor selection database. In addition, the displacement type calculating device 110 is able to read the machine information according to the set of specifications, selects the types of temperature sensors ch1 to ch6 (temperature sensors ch1 to ch4 if the standard specifications, and temperature sensors ch1 to ch6 if the different specifications) corresponding to the bed 102, the headstock 103, the saddle 105, and the tool rest 106 belonging to the set of specifications from the temperature sensor selection database based on the machine information. The displacement type calculating device 110 calculates the estimated thermal displacements of the bed 102, the headstock 103, the saddle 105, and the tool rest 106 (or also the lower saddle 113 and the lower tool rest 114), based on the temperatures of the bed 102, the headstock 103, the saddle 105, and the tool rest 106 (or also the lower saddle 113 and the lower tool rest 114) ascertained by the temperature sensors ch1 to ch4 (or the temperature sensors ch1 to ch6) of the selected types, and calculates the thermal displacement correction amount of the machine tool of the set of specifications by combining the estimated thermal displacements.

Accordingly, with the thermal displacement correcting apparatus according to the second example embodiment, even if the arrangement of the temperature sensors is different for each set of specifications, the common temperature sensor selection database enables the temperature sensors used in the set of specifications for which a correction is to be made to be appropriately selected, so it is no longer necessary to change the setting related to the temperature sensors for each set of specifications. As a result, it is not necessary to spend time with this kind of setting, so productivity and manageability become extremely good.

The thermal displacement correcting method according to the second example embodiment is a method for, in a machine tool that has different sets of specifications (i.e., standard specifications and different specifications) that differ from one another due to the presence/absence of the lower saddle 113 and the lower tool rest 114, calculating the thermal displacement correction amount of the machine tool of at least one of the sets of specifications, that includes a step in which the displacement type calculating device 110 stores a collection of types of the temperature sensors ch1 to ch6 corresponding to all of the bed 102, the headstock 103, the saddle 105, the tool rest 106, the lower saddle 113, and the lower tool rest 114, respectively, as a temperature sensor selection database, a step in which the displacement type calculating device 110 reads the machine information according to the set of specifications, and selects the types of temperature sensors ch1 to ch6 (temperature sensors ch1 to ch4 if the standard specifications, and temperature sensors ch1 to ch6 if the different specifications) corresponding to the bed 102, the headstock 103, the saddle 105, and the tool rest 106 (or also the lower saddle 113 and the lower tool rest 114) belonging to the set of specifications from the temperature sensor selection database based on the machine information, and a step in which the displacement type calculating device 110 calculates the estimated thermal displacements of the bed 102, the headstock 103, the saddle 105, and the tool rest 106 (or also the lower saddle 113 and the lower tool rest 114), based on the temperatures of the bed 102, the headstock 103, the saddle 105, and the tool rest 106 (or also the lower saddle 113 and the lower tool rest 114) ascertained by the temperature sensors ch1 to ch4 (or the temperature sensors ch1 to ch6) of the selected types, and calculates the thermal displacement correction amount of the machine tool of the set of specifications by combining the estimated thermal displacements.

Accordingly, with the thermal displacement correcting method according to the second example embodiment, even if the arrangement of the temperature sensors is different for each set of specifications, the common temperature sensor selection database enables the temperature sensors used in the set of specifications for which a correction is to be made to be appropriately selected, so it is no longer necessary to change the setting related to the temperature sensors for each set of specifications. As a result, it is not necessary to spend time with this kind of setting, so it is extremely easy to formulate a method, and manageability when executing the method can be made extremely good.

[Modified Example]

Another example embodiment of the present invention created mainly by changing the example embodiment described above will now be illustrated.

When estimating the thermal displacement according to the first example embodiment, the detected temperatures of the temperature sensors may be estimated temperatures expressed by [Expression 7] below. Here, $O_{i,t}$ is the estimated temperature of the estimated element i, $O_{i,t-1}$ is the estimated temperature of the estimated element i at the time of the last calculation (and is stored in appropriate storing means), $T_{i,t}$ is the detected temperature of the estimated element i, b is the time interval of the calculations, and $\beta_i$ is the constant at the time of displacement of the estimated element i. Also, $\beta_i$ is linked to the machine information, and is automatically selected as a parameter based on the machine information. Using the estimated temperatures in this way makes it possible to make a highly accurate correction based on the thermal displacement.

$$O_{i,t} = O_{i,t-1} + (T_{i,t} - O_{i,t-1}) \cdot \left(\frac{b}{b - \beta_i}\right) \qquad \text{[Expression 7]}$$

The machine information may be stored in the correction amount estimating device or the temperature measuring device, or a combination of these, instead of being stored in the NC device or the displacement type calculating device, and may be information indicative of a combination of estimated elements instead of being specifications set distinguishing information. At least two of the correction amount estimating device (the displacement type calculating device), the temperature measuring device, and the NC device may be combined and integrated together. The various database data formats and contents may be in various modes, such as one in which temperature sensor numbers are arranged by machine information in the temperature sensor selection database of the second example embodiment. The temperature sensor selection according to the second example embodiment may also be applied in the first example embodiment, and the parameter selection according to the first example embodiment may also be executed in the second example embodiment. The thermal displacement correcting apparatus according to the present invention may also be applied to a machine tool other than a portal machining center.

What is claimed is:

1. A thermal displacement correcting apparatus for a machine tool comprising:
    a correction amount estimating portion that calculates a thermal displacement correction amount of the machine tool based on a combination of a plurality of estimated elements,
    wherein the correction amount estimating portion stores collections of parameters for an estimated thermal displacement calculation as parameter groups, the collections of parameters including a parameter group having at least one parameter as one of the estimated elements different from the estimated elements of at least another parameter group which does not include the at least one parameter,
    reads machine information to determine a presence or an absence of the at least one parameter based on the machine information, when the at least one parameter is present, selects the parameter group for the estimated thermal displacement calculation including the at least one parameter as one of the estimated elements, and when the at least one parameter is absent, selects the at least another parameter group for the estimated thermal displacement calculation which does not include the at least one parameter,
    obtains measurements from sensors for parameters in the selected parameter group,
    calculates an estimated thermal displacement of each estimated element according to the selected parameter group,
    calculates the thermal displacement correction amount of the machine tool by combining the estimated thermal displacements of each estimated element in the selected parameter group, and
    the thermal displacement correcting apparatus outputs the calculated thermal displacement correction amount to an NC device, and the NC device uses the calculated thermal displacement correction amount to correct a movement of a shaft of the machine tool to account for the thermal displacement, thereby increasing an accuracy of a machining of a surface of a workpiece.

2. A method for calculating a thermal displacement correction amount of a machine tool based on a combination of a plurality of estimated elements, the method comprising:
    storing collections of parameters for an estimated thermal displacement calculation as parameter groups, the collections of parameters including a parameter group having at least one parameter as one of the estimated elements different from the estimated elements of at least another parameter group which does not include the at least one parameter,
    reading machine information to determine a presence or an absence of the at least one parameter based on the machine information, when the at least one parameter is present, selecting the parameter group for the estimated thermal displacement calculation including the at least one parameter as one of the estimated elements, and when the at least one parameter is absent, selecting the at least another parameter group for the estimated thermal displacement calculation which does not include the at least one parameter,
    using sensors to measure parameters for the selected parameter group,
    calculating an estimated thermal displacement of each estimated element according to the selected parameter group,
    calculating the thermal displacement correction amount of the machine tool by combining the estimated thermal displacements of each estimated element in the selected parameter group, and
    outputting the calculated thermal displacement correction amount to an NC device, the NC device using the calculated thermal displacement correction amount to correct a movement of a shaft of the machine tool to account for the thermal displacement, thereby increasing an accuracy of a machining of a surface of a workpiece.

* * * * *